United States Patent
Doddi (12)

(10) Patent No.: US 6,591,405 B1
(45) Date of Patent: Jul. 8, 2003

(54) CLUSTERING FOR DATA COMPRESSION

(75) Inventor: Srinivas Doddi, San Jose, CA (US)

(73) Assignee: Timbre Technologies, Inc., Santa Clara, CA (US)

( * ) Notice: Subject to any disclaimer, the term of this patent is extended or adjusted under 35 U.S.C. 154(b) by 98 days.

(21) Appl. No.: 09/727,531

(22) Filed: Nov. 28, 2000

(51) Int. Cl.$^7$ .............................................. G06F 17/50
(52) U.S. Cl. ............................................. 716/7; 716/4
(58) Field of Search .............................. 716/2–4, 7, 18, 716/5; 707/6, 101, 104.1

(56) References Cited

U.S. PATENT DOCUMENTS

| | | | | |
|---|---|---|---|---|
| 5,386,558 A | * | 1/1995 | Maudlin et al. | ............... 706/45 |
| 5,486,998 A | * | 1/1996 | Corso | ........................... 700/32 |
| 5,991,699 A | | 11/1999 | Kulkarni et al. | ............... 702/83 |
| 5,995,644 A | * | 11/1999 | Lai et al. | .................... 382/131 |
| 6,337,654 B1 | * | 1/2002 | Richardson et al. | .......... 342/25 |

OTHER PUBLICATIONS

T. Feder et al., "Optimal Algorithms for Approximate Clustering", Proceedings of the 20th ACM Symposium on Theory of Computing, pp. 434–444, 1988.
T. Gonzalez, "Clustering to Minimize the Maximum Intercluster Distance", Theoretical Computer Science, vol. 38, pp. 293–306, 1985.

* cited by examiner

*Primary Examiner*—Matthew Smith
*Assistant Examiner*—Paul Dinh
(74) *Attorney, Agent, or Firm*—Morrison & Foerster LLP

(57) ABSTRACT

An improved profileometry data collection and analysis system employing software that performs clustering analysis on library data stored in memory that represent semiconductor chip wafer profiles, for use in matching real-time data signals from data collected by profileometry instruments. To better perform a match in real-time between the incoming real-time data signals and the profile library data, cluster analysis is performed on the library data to partition the library data into clusters, and to extract representative cluster data points of the clusters. The representatives of the clusters are stored in primary memory (e.g., RAM), while the data forming the clusters are stored in secondary memory (e.g., a hard drive). A real-time data signal is then first compared to the representative cluster data points, and when a match is made with a particular representative cluster data point, the cluster associated with the representative cluster data point is loaded from secondary memory into primary memory. Next a further search is made with the incoming real-time data signal to find the closest match to the data in the cluster. In this way the entire library data does not have to be searched sequentially, and the entire library does not have to reside in primary memory in order to be quickly searched, which both conserves time and primary memory.

33 Claims, 8 Drawing Sheets

CLUSTERING FOR DATA COMPRESSION

FIELD OF INVENTION

Invention relates to profileometry in the field of non-destructive measurement of wafer layers in the basic wafer-fabrication operations of layering, patterning, doping and heat treatments.

BACKGROUND OF INVENTION

A relationship exists between the physical and optical properties of an IC device and the information from light shined on the IC device by instruments such as an ellipsometer and a scatterometer. The physical and optical properties of a wafer are highly sought after by chip manufacturers, since microchip fabrication machinery can be tuned and optimized once these parameters are known, preferably through non-destructive techniques that operate in real time.

Unfortunately, during wafer fabrication tremendous quantities of data are produced that cannot readily be used by a chip manufacturer to control processes in real-time.

The present invention addresses the concern of quickly turning raw data into information in microchip fabrication, using cluster analysis, a technique of multivariate analysis that creates degrees of association between items and the groups assigned to the items.

SUMMARY OF INVENTION

The invention resides in providing a profileometry system with software that provides for cluster analysis to match incoming real-time data signals collected from profileometry instruments, such as an ellipsometer or scatterometer, with a library of data stored in computer memory. The library data is first represented by clusters, having cluster representative data that is stored in primary memory while the clusters are stored in secondary memory. The incoming real-time data is initially matched with the cluster representatives in primary memory to find the closest matching cluster representative. When a match is found, the cluster associated with the cluster representative having the closest match is loaded from secondary memory to primary memory. This technique avoids the excessive disk thrashing found in prior techniques. The invention makes further use of the observation that in chip fabrication by and large data from measuring instruments is often mathematically continuous.

In a preferred embodiment, the heuristic min-max algorithm of T. Gonzalez is used as the preferred clustering and partitioning method.

Furthermore, various refinements are introduced, such as to account for special cases of borderline matches.

In sum, the advantages of the present invention are, in one preferred embodiment, manifold. First, the number of comparisons that have to be made for each incoming signal significantly reduces from 400K comparisons to less than 10K comparisons. Consequently, there is achieved an improvement in speed by at least 40 times. This can be achieved by selectively comparing only those signals associated with clusters of the best matched cluster representatives. Second, in the absence of enough RAM to load the entire library—which is often the case—the present invention exploits an important aspect of process control systems: the variability of incoming signals, under similar conditions, is small during a certain period of time. This aspect suggests that during a certain period of time the best matches for all the incoming signals can be found in only a subset of clusters. Thus an incoming signal is most likely to find its best match in the data that is already residing in RAM. This significantly reduces the number of swappings that take place during any given period of time. Furthermore, since the amount of data that needs to be swapped is a small fraction of the entire size of the data of the library, the time elapsed due to swapping from hard drive to RAM is negligible, and hence the time elapsed due to matching incoming signals to library signals is not that affected.

BRIEF DESCRIPTION OF DRAWINGS

FIG. 5($d$) is a close-up of a portion of FIG. 5($c$) illustrating the problem of a "borderline match".

DETAILED DESCRIPTION OF PREFERRED EMBODIMENT(S)

Figure 1:
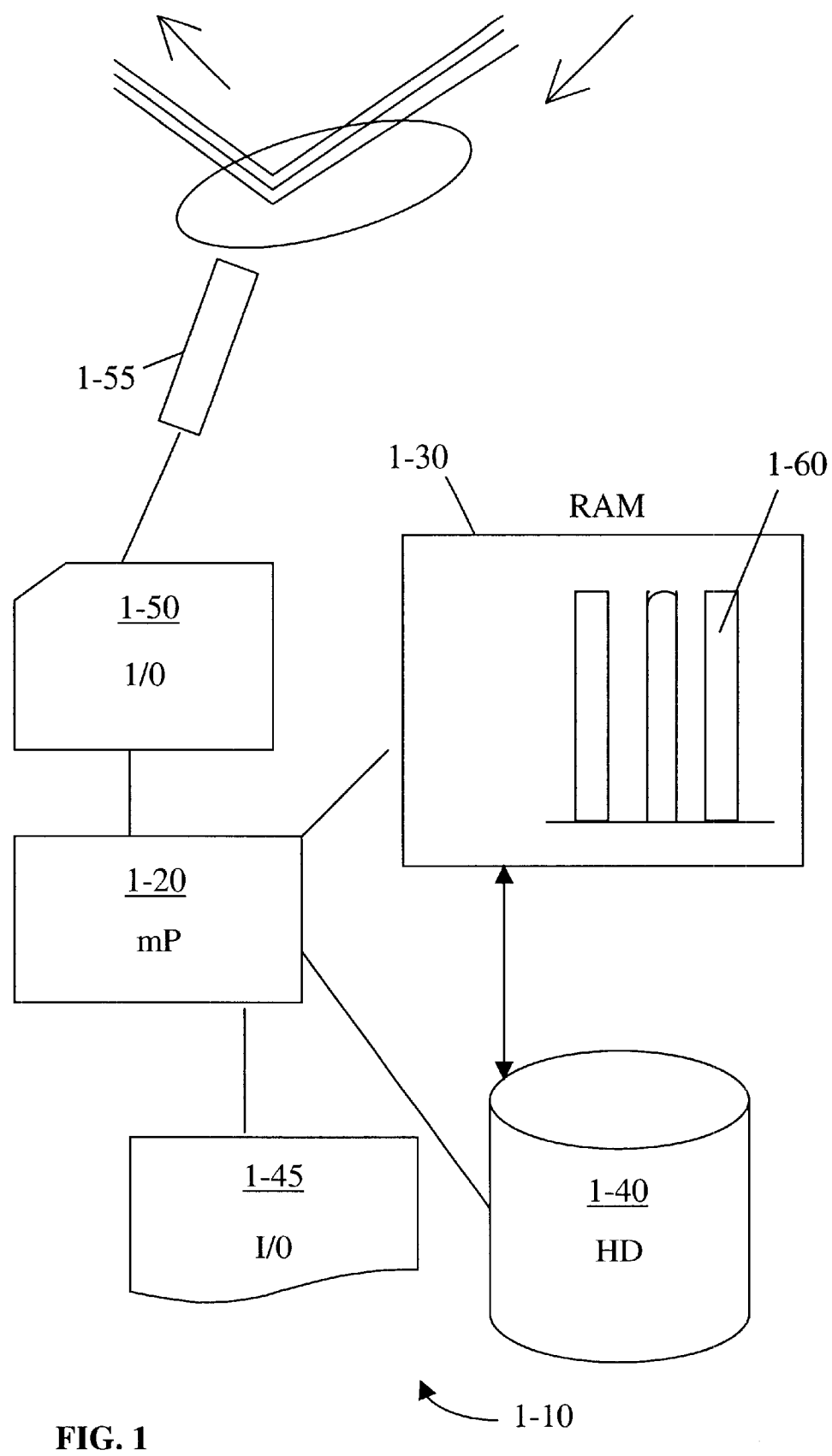
FIG. 1 is block diagram view for the profileometry system implementing the present invention.

FIG. 1 is block diagram view for the profileometry system implementing the present invention. A computer system 1-10 having a processor 1-20, running the software program of the present invention, cooperates with primary memory (i.e., RAM) 1-30, secondary memory (i.e., a hard drive) 1-40 and a plurality of I/O devices 1-45, such as keyboard, mouse and monitor, as well as I/O device 1-50 connected to one or more instruments 1-55 that are used in profileometry, such as an ellipsometer, scatterometer, atomic force microscope (AFM), scanning electron microscope (SEM), transmission electron microscope (TEM), spectrometer (SEM-EDX), or the like, which preferably are real-time measuring instruments, such as an ellipsometer and scatterometer, that collect incoming data, such as scattered or reflected wavelength, in real-time. The data is correlated with library data to ascertain features of interest in die fabrication, such as grain size, profile contours, critical dimension (CD), film layer thickness, and the like.

The computer system of the present invention preferably collects incoming real-time data signals from non-destructive profileometry instruments 1-55, and stores the incoming real-time data signals in primary memory (e.g., RAM), in a format such as a multi-dimensional vector to allow for comparison with library data in the same format. This incoming real-time signal data is then compared against data from a library stored in memory, indicated conceptually in FIG. 1 as the data 1-60 in RAM, in order to find a match between the incoming real-time data and the library data. When a match is made between the incoming real-time data signals collected by the profileometry instruments and the library data stored in RAM, an operator of the present invention knows that the characteristics associated with the library data are also associated with the incoming real-time signal data collected. These characteristics are used to calculate cross-sectional wafer profiles, that are of vital importance in wafer fabrication. In profileometry, it has been found that a relationship exists between the physical and optical properties of an IC device (thickness, coefficients n and k, the critical dimension (CD), and the cross-section profile of a patterned layered wafer) and the magnitude (tan $\Psi$) and phase (cosine $\Delta$) of reflected light shined on the IC device by instruments such as an ellipsometer.

In prior techniques, however, there are potential problems associated with storing and comparing large amounts of profileometry data, which this invention addresses. One problem is the sheer number of comparisons that have to be made between data points collected from instruments and data in the library to find a best match. Thus it is not uncommon to have library data comprising 400,000 library profiles that have to be matched to incoming data to find a best fit. It would be expensive to try and have enough RAM in a computer in order to load all of this library data into RAM, and in some systems it may not be possible to configure a computer system with that much RAM. Each incoming real-time data signal collected by a typical wafer test and evaluation instrument, such as a ellipsometer, is a broadband signal that can be composed of over one-hundred components such as wavelengths. To ensure a more perfect match between incoming real-time data collected and library data, a sufficiently large library of data needs to be stored, presently up to 1 GB in size but in theory having no limit. It is envisioned that in the future even greater amounts of data may be collected, and several libraries of stored signal data may be employed, which creates a further potential bottleneck when using prior techniques to match this data.

Finally, yet another reason RAM is employed to store library data is that incoming data collected from instruments have to be matched to library data in real-time, since microchip fabrication apparatuses are best adjusted in real-time. Having to store library data in secondary memory (e.g., the hard drive) rather than primary memory (e.g., RAM), due to insufficient RAM, or having a large library, slows down the real-time calculations that have to be made, since library data has to be moved from secondary to primary memory.

At some point it becomes economically unfeasible to employ a sufficiently large amount of RAM to store all the library data associated with profileometry. Therefore, the library data has to be stored on a hard drive, and the data is swapped into and out of RAM whenever the computer program calls for it. This kind of "virtual memory" has the disadvantage of being slow, since processor communication with I/O transfer processes is typically several orders of magnitude slower than communication with RAM. Consequently, excessive disk thrashing may occur between RAM and the hard drive, as a program attempts to find the best match between the incoming real-time data collected and library data stored, creating a bottleneck.

To address this problem, the present invention employs, inter alia, a clustering technique that creates clusters from library data, initially loads only the representatives of the clusters into RAM, performs an initial match with incoming real-time data to these cluster representatives, and only then loads the clusters associated with the closest matching cluster representative from the hard drive into RAM to complete the search, thereby reducing potential disk thrashing. Thus the present invention seeks to employ clustering to minimize the number of comparisons and matchings that have to take place between real-time data and library data, while at the same time guaranteeing a best match between real-time data and library data.

Figure 2B:
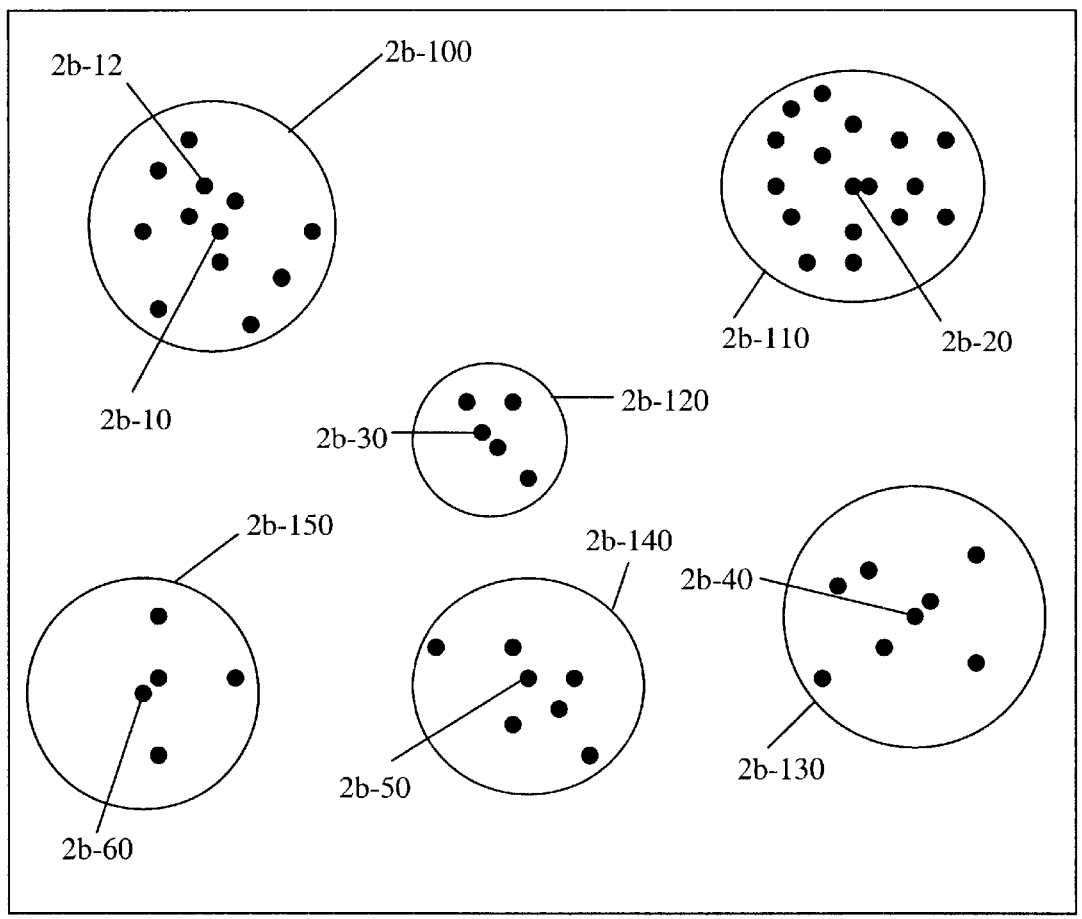
FIGS. 2($a$) and ($b$) are simplified views of a vector field representing profileometry signals, and a two-dimensional cluster map of such points.
Figure 2A:
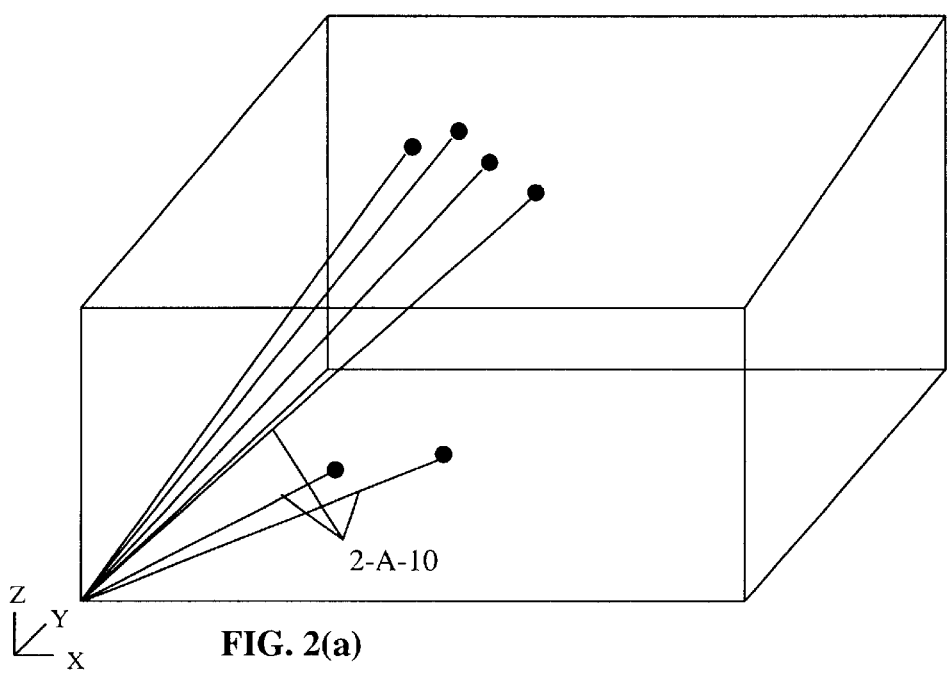

To illustrate the theory behind clustering, FIG. 2(a) illustrates how incoming real-time data signals collected by the system of the present invention from a microchip fabrication process are stored. The data from an incoming real-time data signal from a optical measuring instrument, such as an ellipsometer, is represented as a vector (which in general can be thought of as any parameterized representation of a number into components, such an n-tuple), as illustrated in vectors 2-A-10. Each vector has a plurality of components, in this example three components, the X, Y and Z components. In FIG. 2(a), for illustrative purposes only, a number of three-dimensional vectors having three components (X,Y and Z) are shown. In practice, the incoming real-time profileometry signal (which may also in principal be a signal that was recorded in real-time but stored for later analysis) is represented by a vector of a much higher order than three, i.e., a n-dimensional vector, or equivalently a sequence of numbers of length n (e.g., an n-tuple of numbers), where n is a positive integer; usually denoted by a sequence $\{m_1, m_2, \ldots, m_n\}$, or similar notation. Presently, the vector describing both the incoming real-time data signal collected from profileometry instruments and for describing the stored library data is a vector parameterized or composed of up to 106 components (e.g., $\{X_0, X_1, \ldots X_n\}$, where n=105 in one preferred embodiment). Thus both the library data set and the incoming real-time data signals are represented in the same format. Presently each component (e.g., $X_n$) of the multi-dimensional vector is represented by double-precision numbers in computer memory. Up to 400,000 signals are presently stored in memory and collected by profileometry instruments, with each signal having up to 106 components (which can also be signals such as wavelengths), which requires over 42 million double precision bytes of memory.

Regarding the incoming real-time data signals, there is often a correspondence between an incoming real-time data signal collected from a profileometry instrument and a library signal stored in the computer memory. The computer must match an incoming real-time signal vector with a library data vector stored in memory to find the best fit. Typically the best fit is found by statistical techniques such as a Euclidean distance or "least squares" fit. A range of matching library data vectors that best match the incoming real-time data signal vector may also be found.

Turning attention to FIG. 2(b), there is shown a two-dimensional collection of data points, which can be thought of as the projection of the three-dimensional vector of FIG. 2(a) onto one plane, such as the X,Y plane. A collection of points is formed, such as points 2b-10, 2b-20, 2b-30, 2b-40, 2b-50 and 2b-60, and all data points within the circles 2b-100, 2b-110, 2b-120, 2b-130, 2b-140 and 2b-150, respectively, formed by these points, which collectively may be termed a data set of N items. By inspection it can be seen that the points appear to cluster in groups (e.g., the points within the circles), i.e., "clustering". In the present invention, with the 106 component n-dimensional vectors used in profileometry, such clustering occurs in higher dimensional space and cannot readily be depicted graphically.

One way to physically rationalize the phenomena of clustering is to note that data collected from wafers during fabrication is, by and large, mathematically "continuous", in that data collected at a point in time "t" is similar to data collected at some small interval of time earlier, "t−Δt", as well as data collected at some small interval of time later, "t+Δt". One possible reason for clustering may be that the chemical and mechanical processes forming the wafers tend to vary the wafers in a continuous manner.

Regardless of the physical basis for clustering, if one identifies the cluster groups, such as 2b-100, 2b-110, 2b-120, 2b-130, 2b-140 and 2b-150 in FIG. 2(b), then a representative cluster data center point from each cluster group can be selected. In FIG. 2(b), the representative cluster data center point could be the geometric average of the group, or conceptually, the center point of the circles shown in FIG. 2(b)), such as center data points 2b-10, 2b-20, 2b-30, 2b-40, 2b-50 and 2b-60. Each of these representative cluster data points from each cluster group are stored in RAM memory; then, as each incoming real-time data signal is received, the data signal is compared to the representative cluster data points from each cluster group. The closest match is found between the incoming real-time data signal and the representative cluster data points from each cluster group in RAM. Once the closest match is found, the appropriate cluster (i.e., the set of particular data associated with the representative cluster data point) associated with the particular representative cluster data point (i.e., the cluster center) is loaded from the hard drive into RAM, and a second search for a match is performed to find the closest library data vector within this cluster to the particular incoming real-time data signal vector.

The advantage of the present invention over prior techniques is that rather than having to load all library points (or vectors representing these points in higher dimensional space; in general it should be understood that "points" in space can be represented by a vector or n-tuple) into RAM, or having to rely on slower virtual memory swapping of data into and out of RAM, in order to consider all library points, one only has to first compare the representative cluster data points with the incoming signal data point, and only then swap from the hard drive into RAM those members of the cluster group (or cluster groups, since for "borderline match" cases, as explained further herein, sometimes more than one cluster group has to be considered) associated with the closest representative cluster data point found to the incoming data point. The members of the cluster group thus found are a smaller set that the entire set of library data points. Thus the technique of the present invention speeds up the search for a best match, as well as conserves RAM.

Notwithstanding the above, it should be noted, however, that the present invention would also work with a computer system that is comprised entirely of RAM. The present invention thus does not need to employ swapping of data to and from primary and secondary memory.

To illustrate using the simplified two-dimensional space of FIG. 2(b), suppose that an incoming real-time data point, a signal S, is identical to data point 2b-12 that is a member of the cluster group 2b-100, which has a representative cluster data point center 2b-10. The signal S would be compared by the software program of the present invention to each of the representative cluster object data point centers, 2b-10, 2b-20, 2b-30, 2b-40, 2b-50 and 2b-60, which are stored in RAM, of the clusters 2b-100, 2b-110, 2b-120, 2b130, 2b-140 and 2b-150, whose associated library data members are stored in the hard drive. In this simplified example, the closest match to signal S would be with the representative cluster data point 2b-10, of cluster group 2b-100, which would be found by the program of the present invention after comparing only six such representative cluster data points to the signal S. Once this determination is made, all the library data members associated with data point 2b-10 of cluster 2b-100 would be loaded from the hard drive into RAM. Conceptually, the library data members of the cluster 2b-100 would be the points inside the circle 2b-100. As can be seen by inspection, this collection of data is a mere subset of all the points shown in FIG. 2(b). The search would then continue for the closest match between the signal S and the data of cluster 2b-100, which in this example would be point 2b-12. Once this match is found, the search is terminated. Consequently, neither extensive virtual memory nor a time consuming search of all the data points in the stored library has to be employed.

Figure 3:
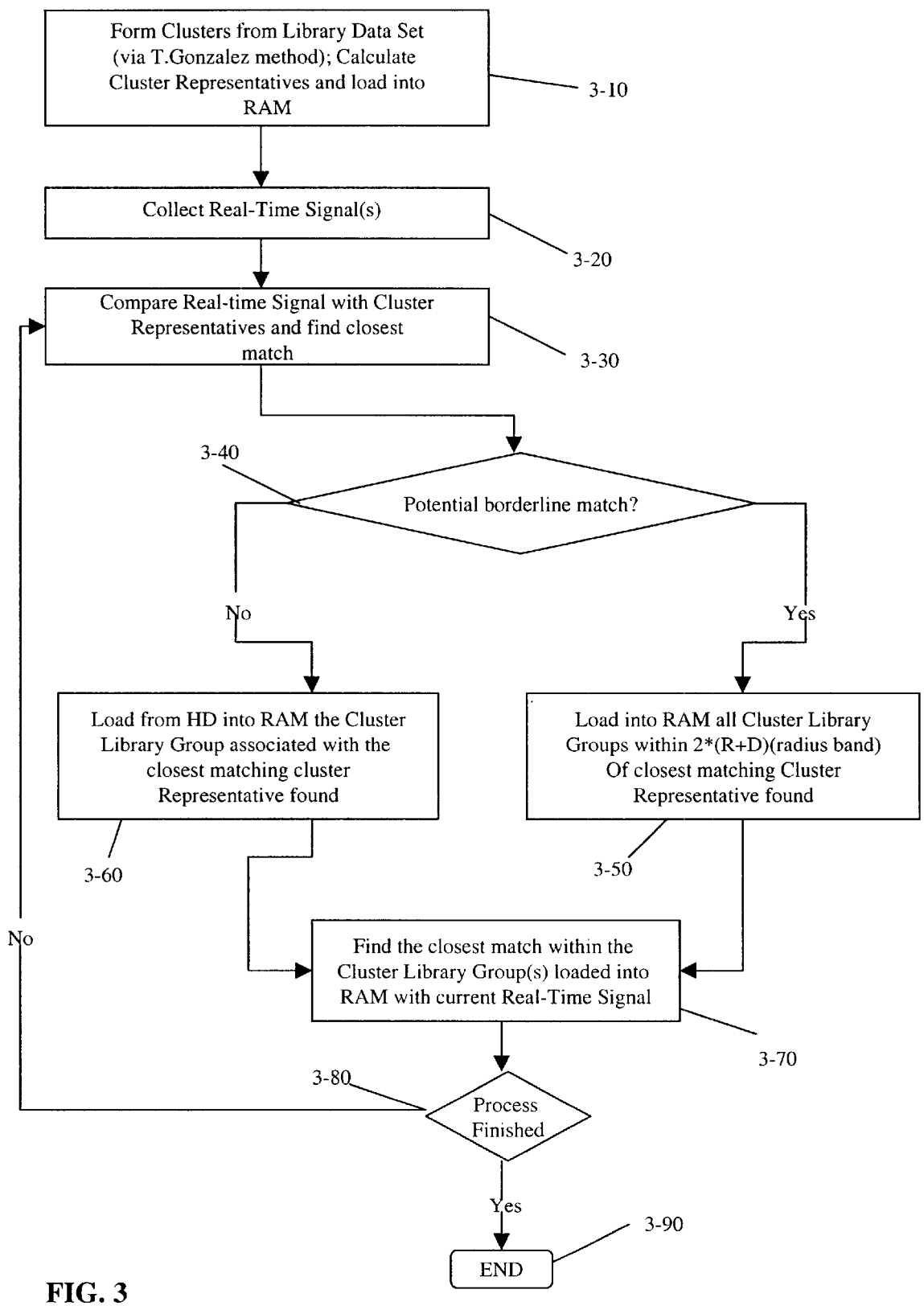
FIG. 3 is a top level flowchart of a preferred method of clustering for the present invention.

Thus, turning to FIG. 3, a top-level flowchart of the present invention is shown. The software tool of the present invention may be written in any computer language and run by a general purpose computer system, having a processor(s), primary and secondary memory cooperating with the processor(s), and I/O means such as monitor, mouse, keyboard, and data collecting instruments of the kind used in profileometry; or any specialized hardware or firmware. Preferably the computer has ample primary and secondary memory storage, as the library data of profiles can be quite large in size.

Depending on the language used to construct and implement the software (which could be any language, such as C, C++, Perl, Java or the like), the software may have any number of classes, functions, objects, variables, templates, lines of code, portions of code and constructs (collectively and generally, "a process step", "step", "block", "software process", "functional module" or "software module") to carry out the invention in successive stages as described and taught herein, and may be either a stand-alone software application, or employed inside of or called by another software application. The software process or software module may be constructed so that one portion of code in the application performs a plurality of functions, as for instance in Object Oriented programming (e.g., an overloaded process). The converse is also true, in that a plurality of portions of code could perform a plurality of functions, and still be functionally the same as a single portion of code. At any stage of the process step of the present invention, intermediate values, variables and data may be stored for later use by the program.

Figure 4:
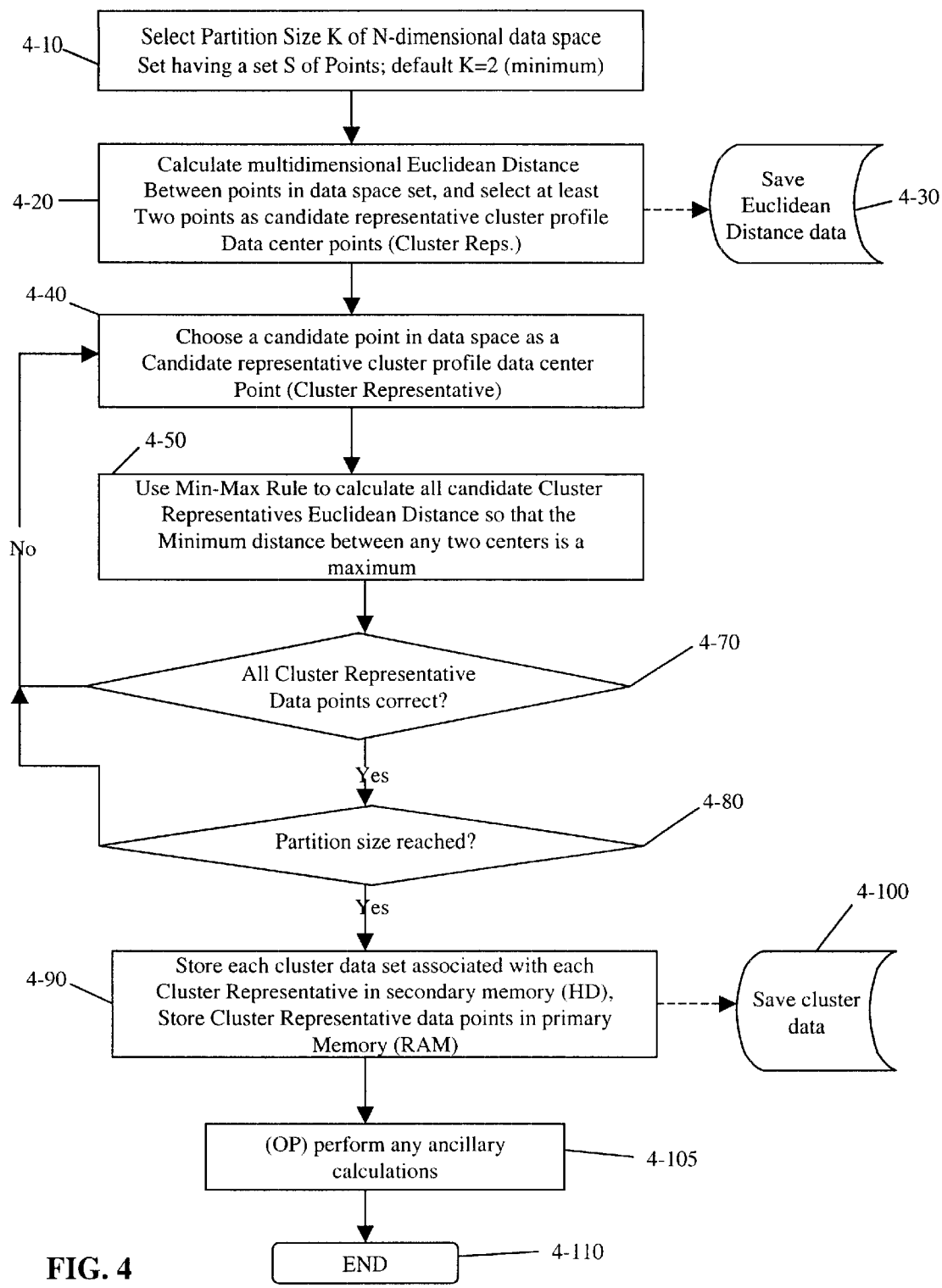
FIG. 4 is a top level flowchart of a preferred method of partitioning data using the technique of clustering.

Thus turning to FIG. 3 there is shown a software module process step 3-10, where the program of the present invention forms, from the set of all the data points constituting a library of profile data, two or more clusters of the data, preferably through the technique of non-hierarchical partitioning, and calculates representative cluster profile data (i.e., cluster representatives) from the library data set for each of the clusters, as described further herein in connection with FIG. 4 and in the method of T. Gonzalez, as referenced in the journal article by T. Gonzalez, "Clustering to Minimize the Maximum Intercluster Distance", Theoretical Computer Science, Volume 38, pp. 293–306, (1985), incorporated by reference herein.

The computer then loads the cluster representatives into RAM, while the clusters (i.e., cluster library groups) themselves are stored on the hard drive. While initially the computation of cluster representatives is time intensive, in the long run the overall program allows for faster execution of profile matching with real-time data signals and conserves the use of primary memory. Because of the lengthy time needed to perform the computation of clusters and cluster representatives, the computation is performed before the start of collecting real-time data from the profileometry instruments.

Next, in software module process step 3-20, the program of the present invention gathers incoming real-time signals relating to data collected from profileometry instruments, such as ellipsometers, and forms a multi-component vector representing this data. Though in fact the signals are "real-time", since interpretation of this data in real-time is of importance in semiconductor fabrication, in theory the signals may also be collected at a previous time and stored, thus the phrase "real-time data" can also include such time-shifted batch data, and generally stands for actual data collected by instruments used in profileometry, or more generally, wafer fabrication. Typically these real-time data are optical broadband signals involving multiple wavelengths, with the real-time data each represented by a vector or n-tuple of over 100 components.

In software module process step 3-30, the program enters a loop where the real-time signal data are compared with the representative cluster library data from step 3-20, in order to find the closest match.

In software module decision block 3-40, the program checks to see if the real-time signal is a potential "borderline match" with the representative cluster profile data center point, as explained further herein. A "borderline match" is generally close to the boundary of the cluster represented by a cluster representative, or, in the case of a higher order sphere, close to the boundary band defined by the radius R of the sphere, where R is the cluster radius Euclidean distance from the representative cluster profile data center point. In the special case of a "borderline match", as explained further in connection with the example of FIG. 5(d), the closest match with the real-time data signal may in fact lie within an adjacent cluster(s), which lies within a distance 2*(R+D), where D is the distance between the signal and the closest representative match, and which has to also be loaded into RAM along with the cluster associated with the cluster representative, as indicated by software module box step 3-50. To define how close to the boundary of a cluster the real-time data signal can be before triggering a "Yes" (TRUE) for the decision box 3-40, one can arbitrarily select that the decision box will be triggered as a "Yes" (TRUE) whenever the Euclidean distance (defined further herein) between the real-time data signal and the closest cluster representative found to the real-time data signal falls between the boundary band of R and R−ϵ, where R=radius of the cluster and ϵ=epsilon, some small margin of error. Thus, for such "borderline match" cases, the clusters that lie within 2*R of the real-time signal band are loaded into RAM, as shown by step 3-50, and the program continues to software module step 3-70.

Otherwise, if a "No" (FALSE) is triggered in decision box 3-40, the program passes control to software module step 3-60, where the cluster library group associated with the closest representative cluster data center point is loaded from the hard drive into RAM.

Next, in software module process step 3-70, the program makes a second comparison, this time between the real-time signal and the cluster(s) of profile library data associated with the cluster representative calculated in step 3-50 or step 3-60. The closest match is found (or closest matches, as it may be advantageous to find a range of closest matches rather than a single closest match), and control is passed to software module decision block 3-80, where if there are no more signals to analyze, the program is ended in step 3-90, otherwise, the program returns to step 3-30 and repeats.

Turning attention now to FIGS. 4 and 5, FIG. 4 is a high level flowchart illustrating the method of the preferred clustering technique of the present invention; while FIGS. 5(a)–(d) illustrate the clustering graphically for a simplified two-dimensional data set.

In a preferred embodiment the clustering method for the present invention is the method known as the T. Gonzalez algorithm, referenced in T. Gonzalez, Clustering to Minimize the Maximum Intercluster Distance, 38 Theoretical Computer Science 293, 293–306 (1985), incorporated by reference herein. There are many different methods of clustering data in any set of data points, any of which can be used in the present invention. The T. Gonzalez algorithm is a preferred method of clustering by partitioning because it has several advantages over other techniques. For one, the preferred T. Gonzalez method of clustering is a non-hierarchical method of clustering known as partitioning, where a given set of data points is partitioned into several unique sets of cluster groups represented by a cluster representative point, and where there is no overlap of clusters (i.e. a data point does not belong to two cluster groups). The partition is performed according to the so-called min-max rule, as explained below, and which for the simple two dimensional case can be thought of as partitioning the data into K sets having a circle with an radius R for each cluster, where R is the same for all clusters, where the cluster representative point is the center of the circle of radius R, and where the following "min-max" rule is satisfied: "for any representative cluster data points in a set Si (where $1 \leq i \leq K$, with K=the partition size, the maximum number of sets that the original set S will be partitioned into, and assuming the original set will be entirely partitioned into sets $\{S_1, S_2, \ldots S_K\}$) minimize the maximum radius formed by the representative cluster data point of any cluster of set Si."

In general, to find what each of the K representative points are, and to find the optimal "maximum radius" for the above min-max rule, is a so-called "N-P hard" problem, a difficult computational problem. The advantage of the so-called heuristic T. Gonzalez algorithm to solving the above min-max partition problem is that it has been shown that if an optimal solution, OPTI(i), to the N-P hard min-max clustering partition problem above exists, and has a optimal radius $R_{OPTI}$, then the T. Gonzalez algorithm will yield a radius $R_{sub-opti}$ that is no more than two times the optimal radius $R_{OPTI}$. This is significant since the further from the optimal radius that a data set is partitioned into clusters, the greater the potential for unrepresentative clustering and errors to occur. In addition, the T. Gonzalez algorithm has the advantage of being nearly a linear process for computational resources and for time, or O(k*N), where k=number of clusters, so that if it takes a given number of computer clock cycles or steps for N inputs to be solved using the T. Gonzalez algorithm, then to solve twice as many inputs generally takes twice the time, and four times as many inputs only takes four times as much time, rather than a non-linear sequence as with some clustering techniques. Finally, the T. Gonzalez algorithm for min-max clustering has been found to converge to a solution fairly quickly.

However, though the non-hierarchical partitioning method of clustering is employed in a preferred embodiment of the invention according to the method of T. Gonzalez, in general any clustering method may be employed using the teachings of the present invention, such as single link (including the SLINK and minimal tree spanning algorithms), complete link, group average link, Voorhees algorithm for group average link, and Ward's method (including the reciprocal nearest neighbor algorithm for Ward's method).

FIGS. 5 (a) to 5(c) graphically illustrate the T. Gonzalez algorithm in two dimensional space. Thus FIGS. 5(a)–(c) show a data set, a collection of a set of points (the black dots in FIGS. 5(a) to 5(c)), such as library data representing data that potentially matches real-time signals captured with profileometry instruments, and with each point represented as vectors. The data set points are represented in two-dimensional space for exposition purposes, since in fact the data is typically of a much higher order, such as the 106 component dimensional vector mentioned above.

As illustrated generally in the flowchart of FIG. 4, there are two principal steps associated with the T. Gonzalez algorithm in determining how to cluster the data. The first is determining what representative cluster data points will be selected, which are defined by a partitioning rule; the second is assigning all the data to these particular representative cluster data points, thus forming a cluster.

Figure 5A:
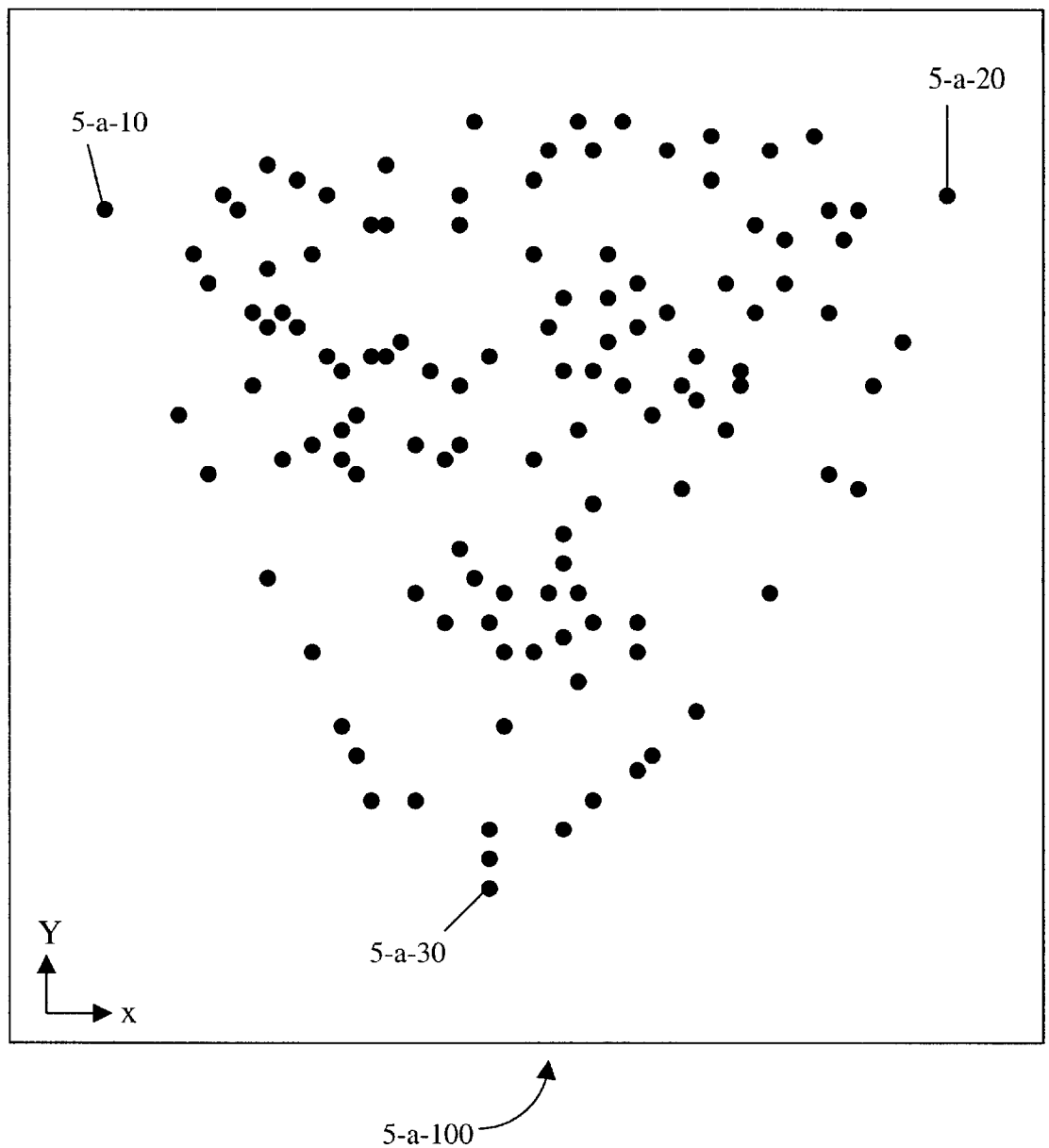
FIGS. 5($a$)–5($c$) are simplified two-dimensional graphical views of a set of data points that are partitioned using a preferred method of clustering.

Assume that the original data set, S, referenced as 5-a-100 in FIG. 5(a), and comprising all the data points, shown as black dots in FIG. 5(a), is to be "clustered" or divided into a plurality of sets of an integer number K, the partition size. Assume the clustering will be non-hierarchical, in that each data point will belong to a unique cluster, and no one data point will belong to two or more clusters. Assume a priori that K=3 sets, that is, the entire data set of points will be divided into three clusters. Note that for any such cluster the minimum size for K equals K=1 set (an extreme condition, as it would be pointless for K to equal one, the original undivided entire set of data points), while the maximum size for K equals the total number of data points (the black dots in FIGS. 5(a)–(c)), which also is an extreme condition. Regarding the optimal size of K in such a cluster, there is literature in clustering theory on choosing the optimal size K, where too small a size of K would leave the sets too "granular" or coarse, while too large a size of K would result in excessive computation. Furthermore, it is possible to graph the value of K versus computational time or computational resources, and it can be noticed by inspection what value of K is optimal. Selecting the partition size K for the n-dimensional data space (n=2 in FIGS. 5(a)–5(c)) is performed in software module step 4-10 in FIG. 4, and may rely on human input.

Turning now to a brief description of nomenclature, the higher-dimensional vector nature of the data points of the set S will now be described. Given a Euclidean n-dimensional space, and a multidimensional vector in that space, having n-tuples or unit vectors describing it (e.g., unit vectors <i, j, k, . . . n>), a arbitrary point "X" in the n-dimensional space can be represented by a vector, having scalar components $\{X_1, X_2, X_3, \ldots x_n\}$ along the unit vector directions, (e.g., <i, j, k, . . . n>), where "$x_1$" is the scalar component of the multidimensional vector along one of the unit vectors (e.g., the "i" unit vector, commonly called the 'x' direction when dealing with three dimensions), "$x_2$" is the scalar component of the multidimensional vector along a second unit vector (e.g., the "j" unit vector, commonly called the 'y' direction), "$x_3$" is the scalar component of the multidimensional vector along a third unit vector, (e.g., the "k" unit vector, commonly called the 'z' direction), and so on, with "$x_n$" designating the last scalar component of the multidimensional vector along the "n" (last) unit vector. Thus, for the coordinate description a given point "X" can be designated by a multidimensional vector <X> in hyper dimensional N-space, can be given as $<X> = <x_1, x_2, x_3 \ldots x_n>$ A second point "Y" can be designated by a multidimensional vector <Y> likewise as:

$<Y> = <y_1, y_2, y_3 \ldots y_n>$

Turning again now to FIG. 4, the software module 4-20 is the next step after step 4-10, where the program calculates Euclidean distances between data points in the set S, and may store the data thus calculated in an output file 4-30 for later use.

The Euclidean distance (E.D.) between points "X" and "Y" in multi-dimensional space can be represented by the vector difference E.D.$_{YX}$=<Y>−<X>, or, $$E.D. = \sqrt{(y_1 - x_1)^2 + (y_2 - x_2)^2 + (y_3 - x_3)^2 + \ldots + (y_n - x_n)^2}$$

As can be seen for the simple case of two dimensions, the Euclidean distance equation collapses to the familiar form for distance between two points in a plane.

Once Euclidean distances are calculated for the points, representative data points for each cluster partition are chosen to satisfy the following rule, which may be termed the T. Gonzalez partition min-max rule.

T. Gonzalez Partition Min-Max rule:

For any representative cluster data points in a set Si (where $1 \leq i \leq K$, with K=the partition size, the maximum number of sets that the original set S will be partitioned into, and assuming the original set will be entirely partitioned into sets $\{S_1, S_2, \ldots S_K\}$) minimize the maximum radius formed by the representative cluster data point of any cluster of set Si.

As described in connection with FIGS. 5(a)–5(c), what this means graphically is that representative cluster data points (the 'centers' of the circles, e.g., see FIG. 2(b)) of any cluster (the "circles" themselves, and the points therein), form circles of equal radius and do not touch each other. In two dimensional space this is somewhat loosely analogous to the patterns formed when equal sized soap bubbles crowd together on a surface of a cup of water by action of surface tension forces.

Graphically, in FIG. 5(a) the likely candidate data points for representative cluster data points that would satisfy the T. Gonzalez criteria would be, for K=2, the extreme end data points of the set, such as extreme data points 5-a-10 and 5-a-20. Another candidate might also be data point 5-a-30, which is also equidistant from the other two data points 5-a-10 and 5-a-20, but in the event of a tie in the application of the rule, one of the two candidates may be arbitrarily chosen (e.g., the first candidate that qualifies).

Figure 5B:
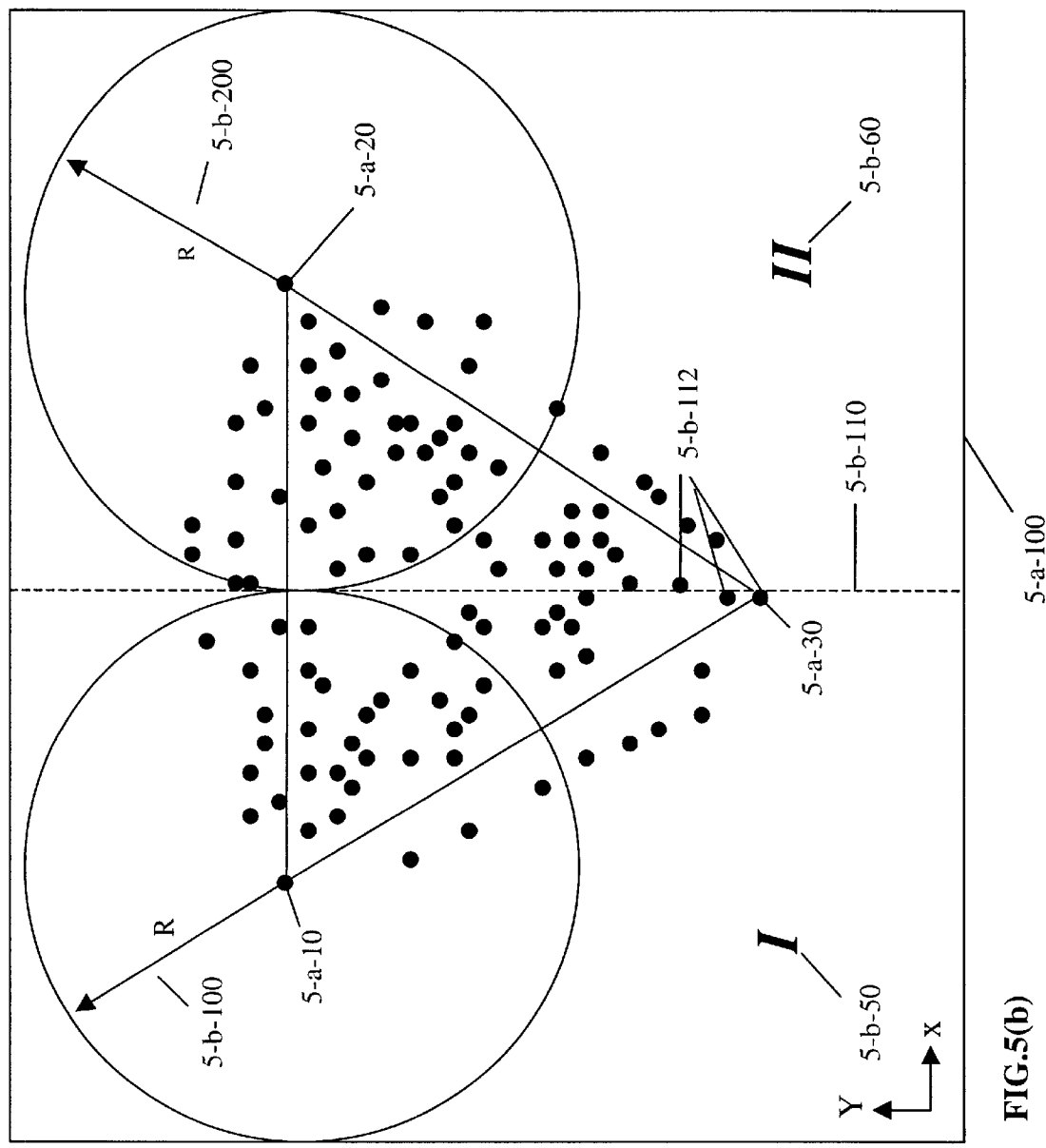
Figure 5C:
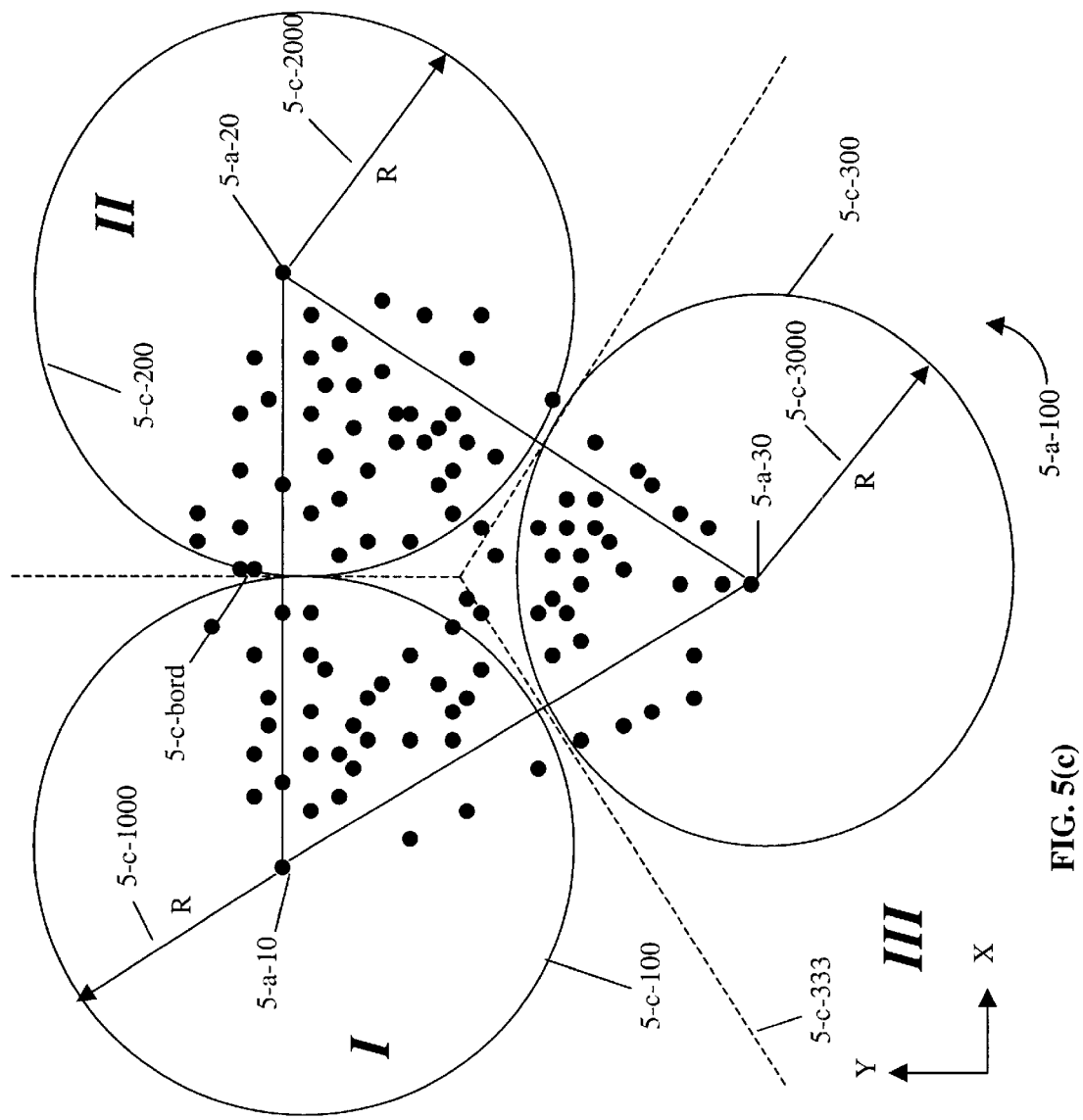
Figure 5D:
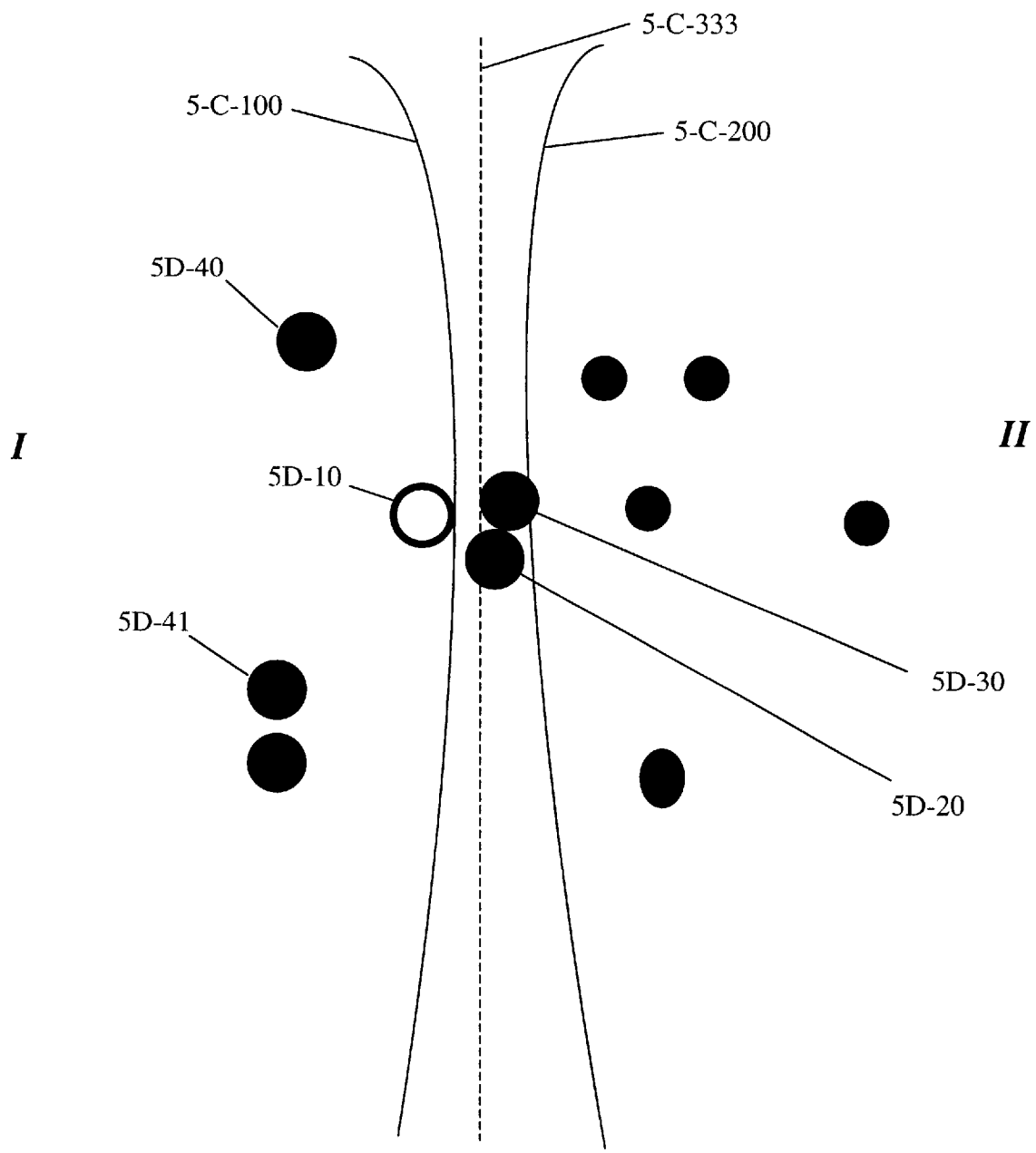

FIG. 5(b) shows the partition of set S of data points into two clusters, after choosing data points 5-a-10 and 5-a-20 as the representative cluster points. In the two dimensional space as shown the data points 5-a-10 and 5-a-20 form centers of circles of equal radius, 5-b-100 and 5-b-200, respectively, which touch each other at boundary 5-b-110. The two representative cluster data points 5-b-10 and 5-a-20 divide the original set 5-b-0 of all the data points into two subsets of points, designated as by the cluster shown as cluster set roman numeral I (reference number 5-b-50) and cluster set roman numeral II (reference number 5-b-60), and all the points contained therein, which all belong to either the cluster set I, having representative cluster point 5-a-10 representing it, or the cluster set II, having the representative cluster point 5-a-20 representing it. Note that the circles for cluster sets I and II help define the representative cluster data points, and that points outside the circles are nonetheless assigned to cluster sets I or II, depending on which representative cluster data point, 5-a-10 or 5-a-20, respectively, is closer in Euclidean Distance.

In the event there is a point on the border that could belong to either cluster, as for example points 5-b-112 in FIG. 5(b), the points may be arbitrarily placed in either of the two clusters.

In FIG. 4, the processes corresponding to the above selection of initial cluster representative points would correspond to the software module comprising process step 4-40. The candidate points for cluster representatives are found heuristically according to the T. Gonzalez min-max rule, as indicated by decision block software module 4-50. This step is typically time and computer resource intensive, and if the candidate representative cluster data points do not satisfy the T. Gonzalez criteria, then new points are chosen and the process is repeated, as indicated by the "NO" branch of step 4-70. Typically, however, it has been found that the algorithm of the T. Gonzalez method converges rapidly and has an error rate for the radius of the circle represented by a representative cluster data center point of no more than two times the optimal radius.

In the software module of decision block 4-80, the software of the present invention checks to see if the limit of K, the partition size, has been reached. In the example of FIGS. 5(a)–5(c), K=3, so the program would branch along the "NO" branch and repeat the loop at block 4-40, where another candidate representative cluster data point would be selected for a third cluster. This is shown graphically in FIG. 5(c), where the point that satisfies the T. Gonzalez partition min-max rule is data point 5-a-30, which happens to be spaced equally apart from the previous representative cluster data points 5-a-10 and 5-a-20. Each of these representative data points, 5-a-10, 5-a-20 and 5-a-30, have radiuses 5-c-1000, 5-c-2000 and 5-c-3000, respectively, that form circles that abut one another, and divide the original set S (5-a-100) into three sub-sets or clusters, designated as cluster set roman numeral I, cluster set roman numeral II and cluster set roman numeral III as shown. The clusters are separated by a boundary 5-c-333, and each of the three clusters are comprised of the data points (i.e., the black dots) found therein. As before, borderline data points to both clusters, such as data point 5-c-bord, may be assigned to either cluster. Furthermore, data points falling outside the circle formed by the representative cluster data points are nonetheless assigned to a particular cluster based on finding the shortest Euclidean distance from the data point in question to nearby representative cluster data points, with the data point assigned to the cluster represented by the closest cluster representative. Thus all data points of the original set S (5-a-100) are assigned to a unique cluster.

In decision block step 4-80, assuming that the predetermined partition size has been reached, the program branches to process step 4-90, where the data set associated with each cluster is stored in secondary memory (e.g., the hard drive, 4-100) while the representative cluster data points representing each cluster are stored in primary memory (e.g., RAM) for use by the program as taught herein.

In software module process block 4-105, any optional computations can be performed, such as, for example, computing, as discussed above, for each point lying in the boundary band of R and R−$\epsilon$, where R=radius of the cluster, D=the distance between the signal and the closest representative match from the boundary band, and $\epsilon$=epsilon or some small margin of error, which clusters lie within 2*(R+D) distance from the points in this boundary band. This calculation could be used for bringing in additional clusters for any real-time signal data that falls as a "borderline match" in this band, by virtue of being the distance defined by this boundary band from the cluster representative. Software module block 4-105 can also be used for error checking or other optional software routines.

Turning again to FIG. 4, assuming no further activity, the program ends in step 4-110.

Further regarding the "borderline match" problem, as explained herein in conjunction with FIG. 3, box 3-40, the problem of matching a real-time data signal with the closest library profile data point is exacerbated when the real-time data signal lies at the boundary of a cluster set. As explained herein, when such real-time signal data lies close to the borderline of a cluster, such as the "borderline band" defined above, the closest match to the real-time signal data may lie with a data point in an adjacent cluster (or more generally within a cluster lying within some distance 2*(R+D) from the borderline band). To illustrate this phenomena graphically, for a simplified two dimensional case, consider FIG. 5(d), which is close-up of a portion of FIG. 5(c) where the circles 5-c-100, 5-c-200, defining cluster sets I and II touch. Assume that an incoming real-time data signal can be represented by a point defined by data point 5D-10. By inspection, it can be seen that this real-time data signal point 5D-10 strictly speaking lies within the cluster set I. So if one were to match the real-time data signal point 5D-10 with the cluster representatives only, the cluster set I would be found as a match and a second search within the cluster set I would yield a point such as cluster point 5D-40 or 5D-41 as the closest cluster profile data point to the real-time signal data point 5D-10. Clearly, however, this is incorrect, as it can be seen by inspection that the closest match (smallest Euclidean distance) to real-time data signal point 5D-10 is one of the points such as 5D-20 or 5D-30, which lie within the cluster set II. Thus, whenever an incoming real-time data signal such as 5D-10 is sufficiently close to the border or boundary of a cluster set, as defined by some borderline band, a "borderline match" case occurs, and the clusters that have to be considered for a closest match to the real-time data signal are all clusters lying within a distance two times the radius R plus D of the border in question, where R equals the radius cluster, and where D is the distance between the signal and the closest representative match from the boundary borderline band. In the example of FIG. 5(c) this would include the clusters I, II and III for such "borderline match" cases. The distance of 2(R+D) is chosen as a margin of safety, to insure all potential closest points are considered, and another conservative margin of safety could also be chosen. In a higher dimension space, there might be more than one or two clusters included within such a distance.

Further regarding the invention, though the clustering technique described herein employs as the preferred clustering algorithm the non-hierarchical clustering algorithm known as the min-max T. Gonzalez algorithm, as referenced by T. Gonzalez, Clustering to Minimize the Maximum Intercluster Distance, 38 Theoretical Computer Science 293, 293–306 (1985), incorporated by reference herein, any clustering method may be employed using the teachings of the present invention. Further, any min-max clustering algorithm may be employed in lieu of the T. Gonzalez algorithm, such as described in the paper by T. Feder and D. Greene, Optimal Algorithms for Approximate Clustering, Proceedings of the 20th ACM Symposium on Theory of Computing (STOC), pp. 434–444 (1988), incorporated by reference herein. In addition other clustering algorithms may be employed. Thus for example other clustering algorithms that may be employed in the present invention may include hierarchical methods such as single link (including the SLINK and minimal tree spanning algorithms), complete link, group average link, Voorhees algorithm for group average link, and Ward's method (including the reciprocal nearest neighbor algorithm for Ward's method). In addition, to solve the min-max problem, in lieu of the T. Gonzalez algorithm other heuristic algorithms may be employed, such as simulated annealing or gradient decent methods, even though such methods are generally inferior to the T. Gonzalez algorithm.

In addition, in the present invention, though the Euclidean distance is the preferred metric for calculating the distance between points, any metric may be used, where appropriate, without detracting from the invention. Furthermore, though a series of circles, spheres or hyper spheres may be envisioned as the geometry defining a particular cluster, any particular geometry may be used, and any particular topology.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks. Other variations and embodiments, are possible in light of above teachings, and it is thus intended that the scope of invention not be limited by this detailed description, but rather by the claims following.

What is claimed is:

1. A profileometry system for use in semiconductor chip fabrication, comprising:
   a computer memory comprising primary memory and secondary memory;
   a software module for representing real-time data collected from instruments as a real-time data signal;
   a software module for clustering a set of library data points in multi-dimensional space into a set of clusters, wherein each cluster has one or more data points and a representative data point,
      wherein the representative data points are stored in the primary memory, and
      wherein the set of clusters are stored in the secondary memory; and
   a comparison software module for comparing be real-time data signal to the representative data points stored in the primary memory to find a closest matching representative data point, and comparing the real-time data signal to the one or more data points of the cluster corresponding to the closest matching representative data point.

2. The system of claim 1, wherein the software module for clustering uses a min-max heuristic clustering algorithm.

3. The system of claim 1, wherein the representative data point of a cluster is a center point of the cluster.

4. The system of claim 1, wherein the primary memory is a random access memory and the secondary memory is a hard drive.

5. The system of claim 1, wherein the primary memory and the secondary memory are random access memories.

6. The system of claim 1, wherein the comparison software module loads the one or more data points of the cluster corresponding to the closest matching representative data point into the primary memory from the secondary memory.

7. The system of claim 1, wherein the comparison software module finds a closest matching data point based on the comparison between the real-time data signal and one or more data points of the cluster corresponding to the closest matching representative data point.

8. The system of claim 7, wherein the comparison software module determines if the closest matching data point is within a distance of a boundary of the cluster.

9. The system of claim 8, wherein the comparison software module compares the real-time data signal to one or more data points of one or more clusters that are within a distance of the closest matching data point when the closest matching data point is within the distance of the boundary of the cluster.

10. The system of claim 9, wherein the comparison software module loads the one or more data points of the one or more clusters that are within a distance of the closest matching data point into the primary memory from the secondary memory.

11. The system of claim 9, wherein the distance of the boundary of the cluster is defined by a radius of a cluster and a margin of error, and wherein the distance of the closest matching data point is defined by a radius of a cluster and a distance between the real-time data signal and the closest matching data point.

12. A profileometry method for use in semiconductor chip fabrication, comprising:
   clustering a set of data points into a set of clusters,
      wherein each cluster has one or more data points and a representative data point;
   storing the representative data points in a first memory;
   storing the set of clusters in a second memory;
   obtaining a real-time data signal;
   comparing the real-time data signal to the representative data points to determine a closest matching representative data point and a closest matching cluster corresponding to the closest matching representative data point; and
   comparing the real-time data signal to the one or more data points of the closest matching cluster.

13. The method of claim 12, wherein clustering a set of data points includes applying a min-max heuristic clustering algorithm.

14. The method of claim 12, wherein the representative data point of a cluster is a center point of the cluster.

15. The method of claim 12, wherein the first memory is a random access memory and the second memory is a hard drive.

16. The method of claim 12, wherein the first memory and the second memory are random access memories.

17. The method of claim 12 further comprising:
   loading the one or more data points of the closest matching cluster into the first memory from the second memory;
   wherein the real-time data signal is compared to the one or more data points of the closest matching cluster loaded into the first memory.

18. The method of claim 12 further comprising:
   determining a closest matching data point based on the comparison between the real-time data signal and one or more data points of the closest matching cluster.

19. The method of claim 18 further comprising:
   determining if the closest matching data point is within a distance of a boundary of the closest matching cluster.

20. The method of claim 19 further comprising:
   when the closest matching data point is within the distance of the boundary of the closest matching cluster, comparing the real-time data signal to one or more data points of one or more clusters that are within a distance of the closest matching data point.

21. The method of claim 20 further comprising:
   loading the one or more data points of the one or more clusters that are within a distance of the closest matching data point into the first memory from the second memory;
   wherein the real-time data signal is compared to the one or more data points of the one or more clusters loaded into the first memory.

22. The method of claim 20, wherein the distance of the boundary of the closest matching cluster is defined by a radius of a cluster and a margin of error, and wherein the distance of the closest matching data point is defined by a radius of a cluster and a distance between the real-time data signal and the closest matching data point.

23. A computer-readable storage medium containing computer executable instructions for causing a computer to cluster data for use in profileometry in semiconductor chip fabrication, comprising instructions for:

clustering a set of data points into a set of clusters,
wherein each cluster has one or more data points and a representative data point,
wherein the representative data points are stored in a first memory, and
wherein the set of clusters are stored in a second memory;

obtaining a real-time data signal;

comparing the real-time data signal to the representative data points to determine a closest matching representative data point and a closest matching cluster corresponding to the closest matching representative data point; and comparing the real-time data signal to the one or more data points of the closest matching cluster.

24. The computer-readable storage medium of claim 23, wherein clustering a set of data points includes applying a min-max heuristic clustering algorithm.

25. The computer-readable storage medium of claim 23, wherein the representative data point of a cluster is a center point of the cluster.

26. The computer-readable storage medium of claim 23, wherein the first memory is a random access memory and the second memory is a hard drive.

27. The computer-readable storage medium of claim 23, wherein the first memory and the second memory are random access memories.

28. The computer-readable storage medium of claim 23 further comprising:

loading the one or more data points of the closest matching cluster into the first memory from the second memory;

wherein the real-time data signal is compared to the one or more data points of the closest matching cluster loaded into the first memory.

29. The computer-readable storage medium of claim 23 further comprising:

determining a closest matching data point based on the comparison between the real-time data signal and one or more data points of the closest matching cluster.

30. The computer-readable storage medium of claim 29 further comprising:

determining if the closest matching data point is within a distance of a boundary of the closest matching cluster.

31. The computer-readable storage medium of claim 30 further comprising:

when the closest matching data point is within the distance of the boundary of the closest matching cluster, comparing the real-time data signal to one or more data points of one or more clusters that are within a distance of the closest matching data point.

32. The computer-readable storage medium of claim 31 further comprising:

loading the one or more data points of the one or more clusters that are within a distance of the closest matching data point into the first memory from the second memory;

wherein the real-time data signal is compared to the one or more data points of the one or more clusters loaded into the first memory.

33. The computer-readable storage medium of claim 31, wherein the distance of the boundary of the closest matching cluster is defined by a radius of a cluster and a margin of error, and wherein the distance of the closest matching data point is defined by a radius of a cluster and a distance between the real-time data signal and the closest matching data point.

* * * * *